3,296,252
TETRACYCLIC DIAZEPINONE COMPOUNDS
Albert J. Frey, Essex Fells, Eugene E. Galantay, Morristown, and Hans Ott, Convent Station, N.J., assignors to Sandoz Inc., Hanover, N.J.
No Drawing. Filed Apr. 2, 1964, Ser. No. 356,977
34 Claims. (Cl. 260—239.3)

This invention provides six classes of compounds which are structurally represented by Formulae I:

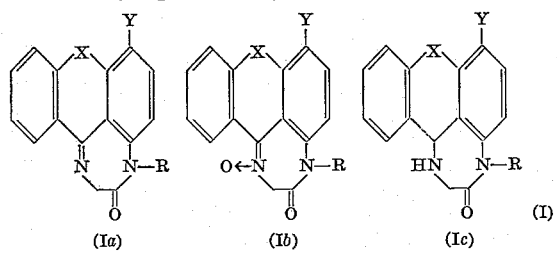

wherein

R is either lower alkyl (preferably having from 1 to 4 carbon atoms), e.g. methyl, ethyl, isopropyl and butyl; allyl; or a hydrogen atom (—H);

Y is either a hydrogen atom (—H) or a chlorine atom (—Cl); and

X is either a direct bond (the first class of compounds), methylene (—CH$_2$—) (the second class of compounds), carbonyl (>C=O) (the third class of compounds), dimethylene (—CH$_2$—CH$_2$—) (the fourth class of compounds), vinylidene (—CH=CH—) (the fifth class of compounds), or trimethylene (—CH$_2$—CH$_2$—CH$_2$—) (the sixth class of compounds).

All six classes of compounds are prepared from starting materials which are either well known or which are themselves prepared from readily available compounds according to procedures which are apparent to the art-skilled. The general procedures for obtaining compounds (I) are outlined in (A) to (D), which follow:

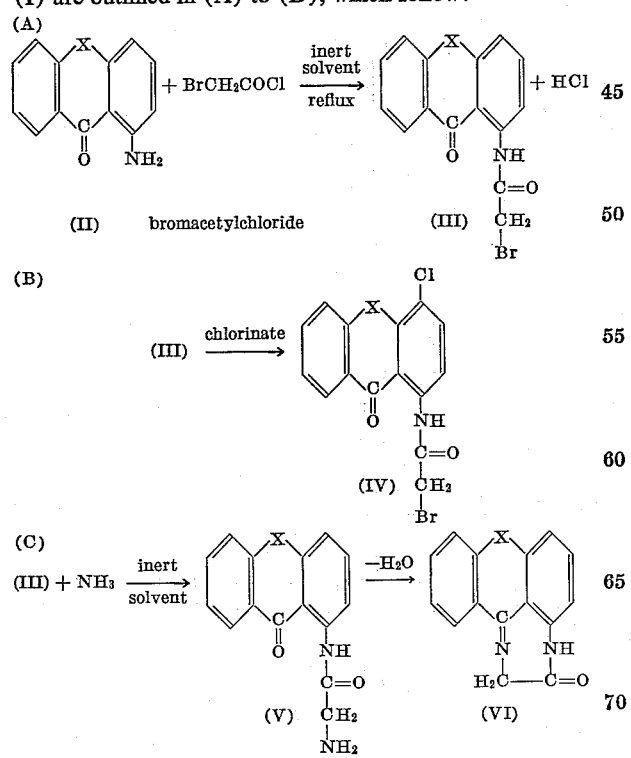

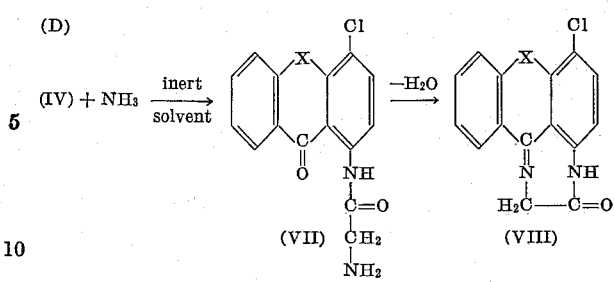

wherein X has each of the previously ascribed meanings.

For reaction (A) any solvent which is inert at reflux temperature to the reactants and to the intermediate (III) can be employed. Examples of suitable inert solvents are benzene and dioxane. Compound (III) precipitates and is separated from the reaction mass by filtration. The chlorination of reaction (B) is effected according to standard procedures for this well-known type of reaction. Compound (III) is dissolved in a suitable solvent, such as acetic acid. Chlorine, bubbled through the resulting solution, produces the desired chlorination. Alternatively, said solution is refluxed with sulfonyl chloride to produce the same result.

Both the unchlorinated intermediate (III) and the chlorinated counterpart (IV) are treated in the same way (reactions C and D, respectively) to produce final products (VI) and (VIII), respectively. Whichever intermediate is selected (depending only on the desired final product), it is dissolved in a suitable solvent, e.g. methyl chloride, methylene dichloride and dimethylformamide (DMF), and saturated with ammonia. The dehydration (ring closure) is effected by heating at reflux in a solvent, e.g. ethanol and pyridine.

It is easiest to produce compounds (according to this invention) in which R is other than hydrogen by an alternate synthetic route in view of difficulty otherwise encountered in some cases in the ring-closure reaction when the secondary amino group of compounds (III), (IV), (V) and (VII) is a tertiary amino group. The alternate route

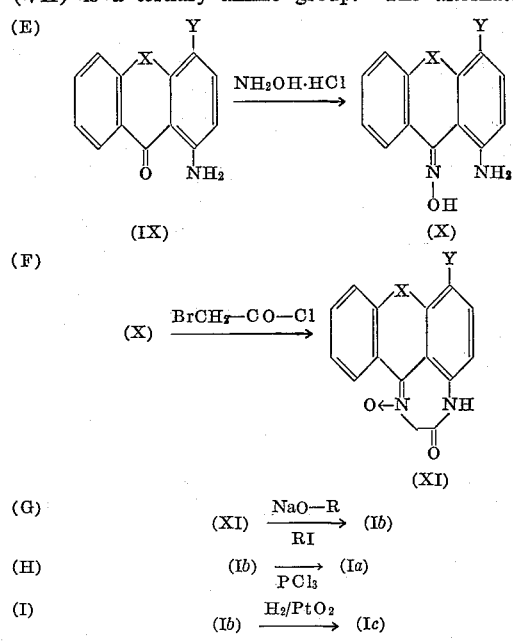

(G)  (XI) $\xrightarrow{\text{NaO—R}}$ (Ib)
        RI (H)  (Ib) $\xrightarrow{\text{PCl}_3}$ (Ia)

(I)  (Ib) $\xrightarrow{\text{H}_2/\text{PtO}_2}$ (Ic)

through the oxime (X) produces the N-oxide (XI), which is sufficiently stable to introduce substituents, R, on the secondary amino nitrogen atom according to reaction (G). Both the thus-substituted and the unsubstituted N-oxide are reduced to (Ia) by reaction (H). In addition, the N-oxide is converted to (Ic) according to reaction (I).

Reactions (E) to (I) are general reactions which are used for each of the contemplated meanings of X, Y and R. A number of compounds (I) thus prepared are exemplified in the following table which presents a two-letter designation for each. The first letter is definitive of the class, i.e. "a" for the first class, "b" for the second class "c" for the third class . . . "f" for the sixth class. The second letter defines the precise form, i.e. (Ia), (Ib) or (Ic), and the substituents Y and R. The two-letter designations are used for convenience in the specific examples.

Notwithstanding the specific limitations heretofore indicated for compounds, it is understood that various changes can be made in the specified structures without materially altering the utility. Although Y is stated to be at a given position on one of the two 6-membered aromatic rings, substituents can be introduced into any two of the three available positions on said one of the two 6-membered aromatic rings and into any one of the four available positions on the other of the two 6-membered aromatic rings. In addition to the disclosed hydrogen atom and chlorine atom for Y, said substituents can be any combination of these and other halogen atoms, e.g. bromide (—Br), fluorine (—F) and iodine (—I); nitro (—NO₂; trifluoromethyl (—CF₃); primary amino (—NH₂); lower alkanoyl(secondary)amino, e.g.

finyl and pentylsulfinyl; lower alkoxy, e.g. methoxy, ethoxy, propoxy, isopropoxy and butoxy; hydroxy (—OH); lower alkyl, e.g. methyl, ethyl, propyl, isopropyl, butyl, 1-methyl-propyl, 2-methyl-propyl, amyl, 1-methyl-butyl, 2-methyl-butyl and 3-methyl-butyl; cyano (—CN); carboxy (—COOH); carb(lower)alkoxy, i.e. —CO—O—(lower)alkyl, e.g. carbomethoxy, carbethoxy, carbopropoxy, carbisopropoxy and carbobutoxy; carbamyl (—CO—NH₂)

di(lower)alkylamino, e.g. dimethylamino, diisopropylamino, dibutylamino, N-methyl-N-butylamino and N-ethyl-N-isopropylamino; and di(lower)alkylamino-(lower)alkyl, i.e. —(lower)alkylene-N[di(lower)alkyl], e.g. 2-(N,N-dimethyl)-aminoethyl, 2-(N-ethyl-N-isopropyl)-aminoethyl, 3-(N,N-dibutyl)-aminopropyl and 3-(N-methyl-N-butyl)-aminopropyl.

Moreover, with each combination of any of the aforesaid in the noted available positions R is, alternatively, any one of a much larger range of substituents than is indicated supra. The larger range includes a hydrogen atom (—H); lower alkyl, e.g. methyl, ethyl, propyl, isopropyl and amyl; lower alkenyl, e.g. vinyl, allyl, isopropenyl, isoprenyl and butenyl; lower alkynyl, e.g. ethynyl,

DESIGNATIONS FOR COMPOUNDS

| Formula | Y | R | Class | | | | | |
|---|---|---|---|---|---|---|---|---|
| | | | 1 | 2 | 3 | 4 | 5 | 6 |
| (Ia) | —H<br>—H<br>—H<br>—H<br>—Cl<br>—Cl<br>—Cl<br>—Cl | Generic<br>—H<br>—CH₃<br>—CH₂—CH=CH₂<br>Generic<br>—H<br>—CH₃<br>—CH₂—CH=CH₂ | aa<br>ab<br>ac<br>ad<br>ae<br>af<br>ag<br>ah | ba<br>bb<br>bc<br>bd<br>be<br>bf<br>bg<br>bh | ca<br>cb<br>cc<br>cd<br>ce<br>cf<br>cg<br>ch | da<br>db<br>dc<br>dd<br>de<br>df<br>dg<br>dh | ea<br>eb<br>ec<br>ed<br>ee<br>ef<br>eg<br>eh | fa<br>fb<br>fc<br>fd<br>fe<br>ff<br>fg<br>fh |
| (Ib) | —H<br>—H<br>—H<br>—H<br>—Cl<br>—Cl<br>—Cl<br>—Cl | Generic<br>—H<br>—CH₃<br>—CH₂—CH=CH₂<br>Generic<br>—H<br>—CH₃<br>—CH₂—CH=CH₂ | ai<br>aj<br>ak<br>al<br>am<br>an<br>ao<br>ap | bi<br>bj<br>bk<br>bl<br>bm<br>bn<br>bo<br>bp | ci<br>cj<br>ck<br>cl<br>cm<br>cn<br>co<br>cp | di<br>dj<br>dk<br>dl<br>dm<br>dn<br>do<br>dp | ei<br>ej<br>ek<br>el<br>em<br>en<br>eo<br>ep | fi<br>fj<br>fk<br>fl<br>fm<br>fn<br>fo<br>fp |
| (Ic) | —H<br>—H<br>—H<br>—H<br>—Cl<br>—Cl<br>—Cl<br>—Cl | Generic<br>—H<br>—CH₃<br>—CH₂—CH=CH₂<br>Generic<br>—H<br>—CH₃<br>—CH₂—CH=CH₂ | aq<br>ar<br>as<br>at<br>au<br>av<br>aw<br>ax | bq<br>br<br>bs<br>bt<br>bu<br>bv<br>bw<br>bx | cq<br>cr<br>cs<br>ct<br>cu<br>cv<br>cw<br>cx | dq<br>dr<br>ds<br>dt<br>du<br>dv<br>dw<br>dx | eq<br>er<br>es<br>et<br>eu<br>ev<br>ew<br>ex | fq<br>fr<br>fs<br>ft<br>fu<br>fv<br>fw<br>fx | acetamido, propionamido, n-butyramido and isobutyramido; lower alkylthio, e.g. methylthio, ethylthio, propylthio, isopropylthio and butylthio; lower alkylsulfonyl, i.e. —SO₂—(lower)alkyl, e.g. methylsulfonyl, isopropylsulfonyl and butylsulfonyl; lower alkylsulfinyl, i.e. —SO—(lower)alkyl, e.g. methylsulfinyl, ethylsulfinyl, isobutylsulfinyl, propynyl-2-, butynyl-1- and pentynyl-3-; lower alkanoyl, e.g. actyl, propionyl, butyryl, isobutyryl and n-valeryl; and

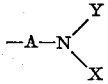

wherein

A is either alkylene, e.g. methylene, ethylene, propylene, isopropylene and butylene; or lower alkylene carboxylic acid acyl, such as —CO—(CH$_2$)$_m$— in which $m$ is a positive integer from 1 to 5, inclusive, e.g.

—CO—CH$_2$—, —CO—CH$_2$—CH$_2$—
—CO—(CH$_2$)$_3$— and —CO—CH$_2$)$_4$; and each of Y and Z is, independently, either a hydrogen atom (—H); lower alkyl, e.g. methyl, ethyl, propyl, isopropyl and butyl; lower alkanoyl, i.e. —CO—(lower)alkyl, e.g. acetyl, butyryl, isobutyryl and n-valeryl; phenyl; phenyl(lower)alkyl, e.g. benzyl; and cyclo(lower)alkyl, e.g. cyclohexyl; or
Y and Z form, together with the nitrogen atom to which they are both bonded, a heterocyclic ring having at most six ring members, e.g. piperidino, piperazino, pyrazolo, pyrrolo, pyrrolidino, pyrrolino, morpholino, imidazolo, thiamorpholino and glyoxalidino;
e.g. 2-dimethylaminopropyl, 2-aminoethyl, 3-ethylaminopropyl, 4-(N-methyl - N - ethyl)-aminobutyryl, N-piperidino-ethyl and N-thiomorpholino-isopropyl carbonyl.

In addition one or two substituents are, alternatively, bonded to the sole carbon atom in the diazepine ring which is saturated and unsubstituted. Such substituents are, independently, either a hydrogen atom (—H); lower alkyl, e.g. methyl, ethyl, propyl, isopropyl and butyl; hydroxy (—OH); or lower alkyl carboxylic acid acyloxy, i.e. —O—CO—(lower)alkyl, e.g. acetoxy, propionoxy, isopropionoxy, butyroxy and valeroxy.

All of the compounds with any of the expanded definitions or combinations thereof are prepared from known starting materials and known procedures, i.e. in addition to the preceding procedures and those hereinafter exemplified.

Compounds (I) are pharmacologically useful compounds. They are useful as CNS depressants and are tranquilizers. Administration of these compounds is either oral or parenteral.

Although dosages may vary somewhat from compound to compound and may also depend upon the severity of the condition being treated, suitable dosages are within the range of from 10 milligrams to 50 milligrams per day.

1. THE FIRST CLASS OF COMPOUNDS

The class of compounds, as each of the other classes, is prepared in accord with the above-noted reaction schemes. The class itself is represented by the structures

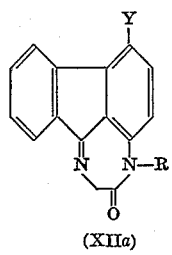
(XIIa)
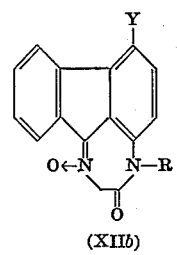
(XIIb)
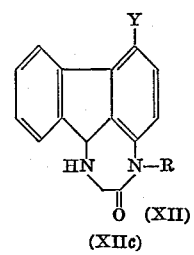
(XIIc)

wherein Y and R have the previously ascribed meanings.

The following examples for the first class of compounds and the examples for the other six classes are merely illustrative of the invention. In all of the examples the parts and percentages are by weight unless otherwise stated, and the temperatures are in degrees Centigrade. The relationship between parts by weight and parts by volume is the same as that between the kilogram and the liter.

Example 1

1-BROMOACETYLAMINO-9-FLUORENONE

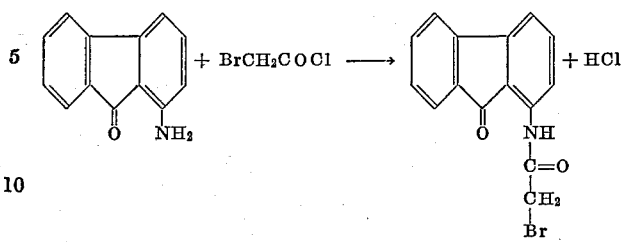

Reflux 2 parts (1 mole) of 1-amino-9-fluorenone and 2 parts (1.3 mole) of bromoacetylchloride in 40 parts of absolute benzene for one hour. Evaporate the refluxed product to dryness. Recrystallize the crystalline residue from ethyl acetate. A 95 percent yield of the title compound, based on the starting weight of 1-amino-9-fluorenone, is thus obtained. The crystals of the title compound are yellow prisms.

Example 2

1-AMINO-4-CHLORO-9-FLUORENONE

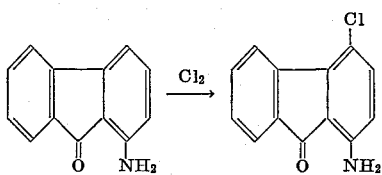

Dissolve 1 part of 1-amino-9-fluorenone in 10 parts of glacial acetic acid. To the obtained solution add 4 parts of glacial acetic acid saturated with chlorine. Permit the resultant reaction mixture to stand at room temperature (20° C.) for 5 hours. Thereafter concentrate the reaction mixture in vacuo. The title compound thus crystallizes as yellow needles.

Example 3

3,4-DIHYDROFLUORENO[1,9a,9-e,f]1,4-DIAZEPIN-3(2H)-ONE

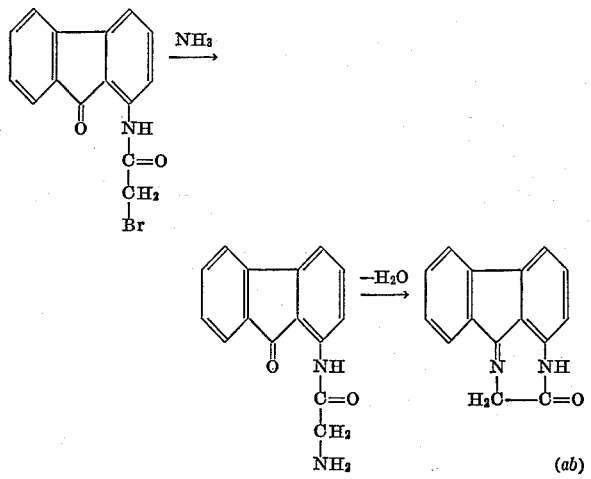

Dissolve 1 part of 1-bromoacetylamino-9-fluorenone in 20 parts of DMF. Saturate the obtained solution with ammonia, and permit the resultant reaction mixture to stand at room temperature for 10 hours. Thereafter add water to the reaction mixture to precipitate 1-glycylamino-9-fluorenone.

Reflux the 1-glycylamino-9-fluorenone in 20 parts of absolute ethanol. Ring closure is thus effected to produce the tetracyclic Schiff base (ab). Concentrate the ethanolic solution in vacuo to crystallize the title compound (ab) as yellow prisms.

Example 4
1-AMINO-4-CHLORO-9-FLUORENONE OXIME

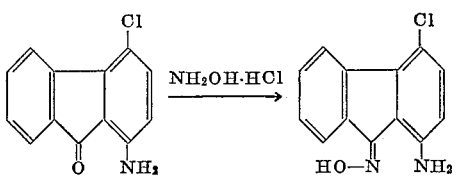

Dissolve 1 part of 1-amino-4-chloro-9-fluorenone and 1 part of hydroxylamine hydrochloride in 5 parts of ethanol and 5 parts of pyridine. Reflux the obtained solution for two hours. Add water to the reaction mixture to precipitate 1-amino-4-chloro-9-fluorenone oxime as yellow needles.

Example 5
7-CHLORO-3,4-DIHYDROFLUORENO[1,9a,9-e,f]1,4-DIAZEPIN-3(2H)-ONE-1-OXIDE

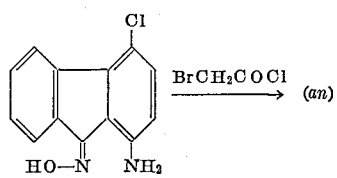

Dissolve 1 part of 1-amino-4-chloro-9-fluorenone oxime (title compound of Example 4) in 20 parts of dioxane. Add dropwise (within a period of fifteen minutes) to the resulting solution at a temperature of from 10° to 20° 0.9 part of bromacetylchloride. To the product slowly add (under stirring) 3 equivalents of sodium hydroxide (as a 10% aqueous solution) to precipitate the title compound (am).

Example 6
1-AMINO-9-FLUORENONE OXIME

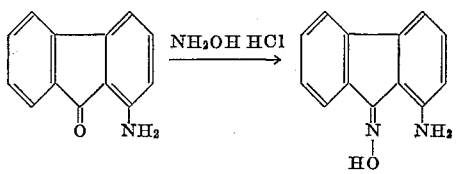

Dissolve 1 part of 1-amino-9-fluorenone and 1 part of hydroxylamine hydrochloride in a mixture of 5 parts of ethanol and 5 parts of pyridine. Reflux the thus-produced solution (reaction mixture) for two hours. Thereafter add water to the reaction mixture to precipitate the title compound as yellow needles.

Example 7
3,4-DIHYDROFLUORENO[1,9a,9-e,f]1,4-DIAZEPIN-3(2H)-ONE-1-OXIDE

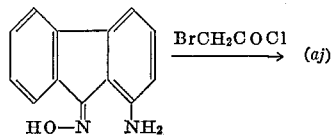

Dissolve 1 part of 1-amino-9-fluorenone oxime (title compound of Example 6) in 20 parts of dioxane. Add dropwise (within a period of fifteen minutes) to the resulting solution 0.8 part of bromacetylchloride at a temperature of from 10° to 20°. Thereafter slowly add to the product (under stirring) three equivalents of sodium hydroxide (in the form of a 10% aqueous solution) to precipitate the tetracyclic title compound (aj) as yellow prisms.

Example 8
4-METHYL-3,4-DIHYDROFLUORENO[1,9a,9-e,f]1,4-DIAZEPIN-3(2H)-ONE-1-OXIDE

Dissolve 2.4 parts (1 mole) of (aj) in 50 parts of methanol. Add 0.6 part (1.1 mole) of sodium methoxide in methanol to the obtained solution. Evaporate the product to dryness.

Dissolve the residue (sodium salt) in 15 parts of DMF. Add 1.5 parts of methyl iodide dropwise to the resultant DMF solution over a period of twenty minutes. Thereafter add water to precipitate the title compound (ak). Recrystallize (ak) from absolute ethanol.

Using (an) instead of (aj) as the starting N-oxide and following the same procedure result in the production of compound (ao).

Example 9
7-CHLORO-4-METHYL-3,4-DIHYDROFLUORENO[1,9a,9-e,f]1,4-DIAZEPIN-3(2H)-ONE

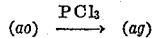

Dissolve 1 part of (ao) in a mixture of 30 parts of chloroform and two parts by volume of phosphorus trichloride. Reflux the obtained solution for 40 minutes. Evaporate the resulting reaction mixture to dryness in vacuo. Shake the residue concurrently with methylene chloride, an excess (for neutralization) of 30% sodium hydroxide and ice. Evaporate the organic solvent, and filter off the precipitated reaction product (ag). Recrystallize (ag) from ethanol.

Replacing the methyl group of (ao) with any other lower alkyl group, e.g. ethyl, propyl, isopropyl and butyl, results in the corresponding compound (ae), wherein the lower alkyl group remains unchanged throughout the reaction. Likewise, replacing (ao) with (ap) as the starting N-oxide results in the production of (ah) according to the procedure of this example. In the same manner with either any (am) or any (ai) as the starting N-oxide, the corresponding (ae) or (aa), respectively, is prepared.

The application of the process illustrated by Example 10 is equally as generic.

Example 10
7-CHLORO-4-METHYL-1,2,3,4-TETRAHYDROFLUORENO[1,9a,9-e,f]1,4-DIAZEPIN-3-ONE

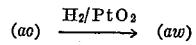

Dissolve 1 part of (ao) in 30 parts of hot (70°) acetic acid. Cool the resulting solution to room temperature (20°), and hydrogenate catalytically (0.05 part of platinum oxide as catalyst) on a shaking apparatus.

Thereafter filter off the catalyst. Evaporate the filtrate to dryness, and crystallize the tetracyclic base (aw) from ethanol as white prisms.

The procedures illustrated for each class of compounds are likewise applicable to all of the classes of compounds.

2. THE SECOND CLASS OF COMPOUNDS

This class of compounds is represented by the structures

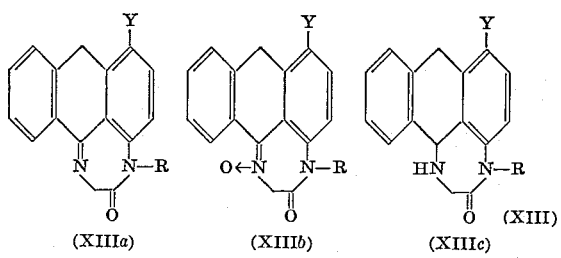

wherein Y and R have the previously ascribed meanings.

Example 11
1-BROMOACETYLAMINO-ANTHRONE

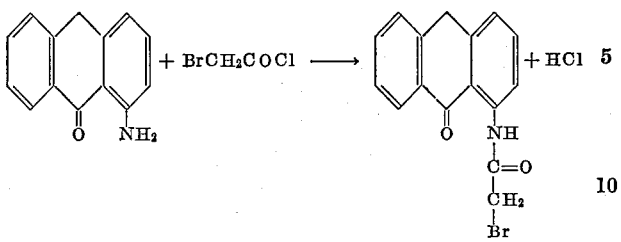

Reflux 1 part of 1-amino-anthrone and 1 part of bromoacetylchloride in 20 parts of absolute benzene for 1 hour under nitrogen. Evaporate the refluxed material to dryness. Crystallize the residue from ethyl acetate to obtain yellow crystals of the title compound.

Example 12
1-BROMOACETYLAMINO-4-CHLORO-ANTHRONE

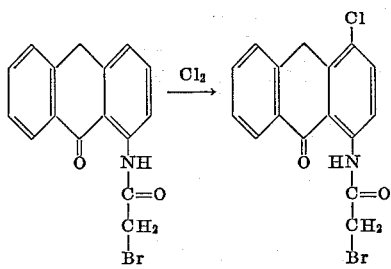

To 1 part of 1-bromoacetylamino-anthrone in 20 parts of glacial acetic acid, add 6 parts of a chlorine-saturated glacial acetic acid solution. Maintain the reaction mixture at room temperature for 7 hours. Thereafter concentrate the reaction mixture in vacuo, whereupon the title compound crystallizes as yellow needles.

Example 13
2,3,4,8-TETRAHYDROANTHRA[1,9a,9-e,f]1,4-DIAZEPIN-3-ONE

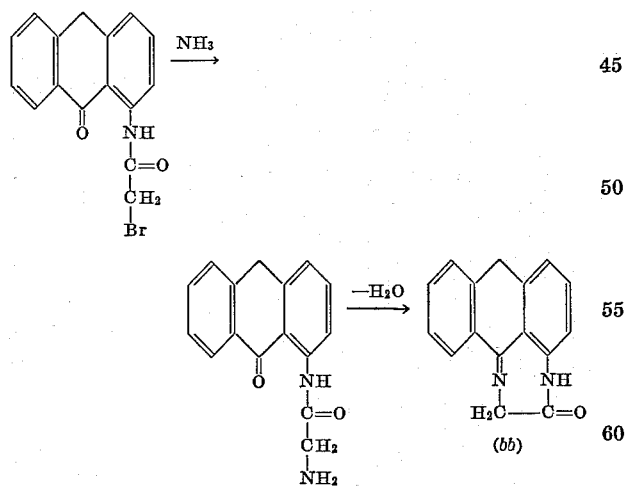

Saturate with ammonia a solution of 1 part of 1-bromoacetylamino-anthrone in 20 parts of DMF. Maintain the saturated solution at room temperature for from 5 to 15 hours before adding water thereto and thus precipitating 1-glycylamino-anthrone.

Reflux the 1-glycylamino-anthrone in 30 parts of absolute ethanol for thirty minutes to effect ring closure and thus produce the tetracyclic Schiff base (bb).

Concentrate the refluxed ethanolic solution to obtain crystals of (bb) as yellow prisms.

Repetition of this example, using 1-bromoacetylamino-4-chloro-anthrone instead of 1-bromoacetylamino-anthrone results in the preparation of 1-glycylamino-4-chloro-anthrone and (bf), in place of 1-glycylamino-anthrone and (bb), respectively. Yellow prisms of (bf) crystallize on cooling the refluxed ethanolic solution of 1-glycylamino-4-chloro-anthrone.

Example 14
1-METHYLAMINO-ANTHRONE OXIME

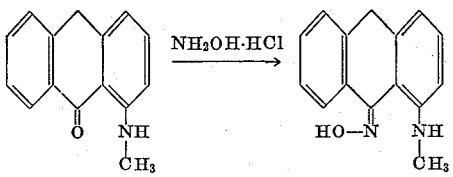

Dissolve 1 part of 1-methylamino-anthrone and 1 part of hydrocylamine hydrochloride in a mixture of 5 parts of ethanol and 5 parts of pyridine. Reflux the obtained solution for four hours under nitrogen. Add water to the reaction mixture to precipitate the title compound as yellow crystals.

Example 15
4-METHYL-2,3,4,8-TETRAHYDROANTHRA[1,9a,9-e,f] 1,4-DIAZEPIN-3-ONE-1-OXIDE

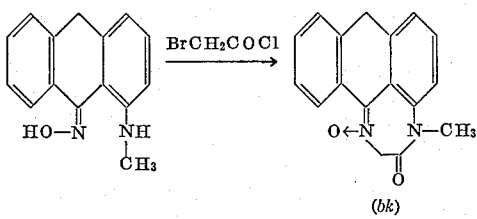

Dissolve 1 part of 1-methylamino-anthrone oxime in 20 parts of dioxane. Add dropwise to the obtained solution 0.75 part of bromoacetylchloride at from 10° to 20° within 10 minutes. Then admix slowly with the product under stirring 3 equivalents of dilute sodium hydroxide solution to precipitate the tetracyclic compound (bk).

3. THE THIRD CLASS OF COMPOUNDS

This class of compounds is represented by the structures

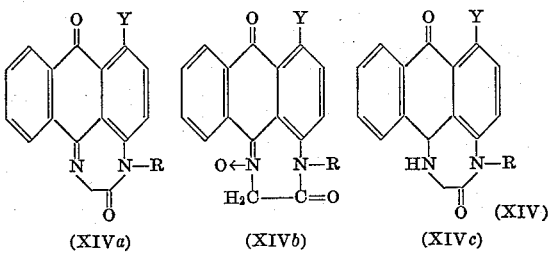

wherein Y and R have the previously ascribed meanings.

Example 16
1-BROMOACETYLAMINOANTHRAQUINONE

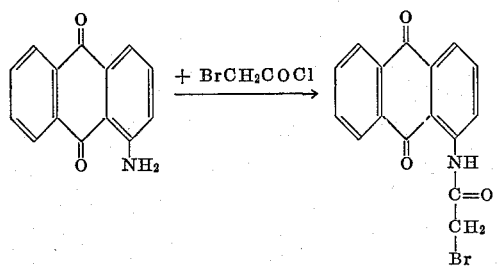

Reflux 1 part of 1-aminoanthraquinone and 2 parts of bromoacetyl chloride in 30 parts of absolute benzene for 1 hour. Cool the refluxed material to room temperature to crystallize the title compound as bright yellow prisms.

11
Example 17
2,3,4,8-TETRAHYDROANTHRA[1,9a,9-e,f]1,4-DIAZEPINE-3,8-DIONE

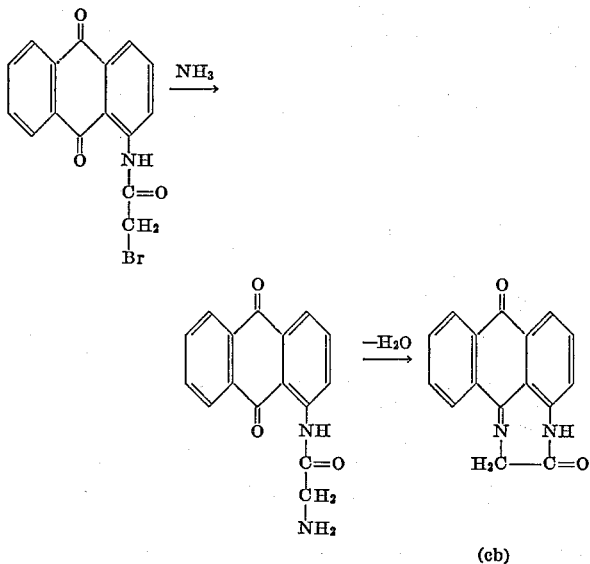

(cb)

Dissolve 1 part of 1-bromoacetylamino anthraquinone in 20 parts of DMF, and saturate the resulting solution with ammonia. Maintain the ammonia-saturated reaction mixture at room temperature for 10 hours prior to diluting same with water, whereupon 1-glycylaminoanthraquinone is precipitated. Filter off the precipitate.

Reflux said precipitate in absolute ethanol for 12 hours, and thereafter concentrate the resulting ethanolic reflux to crystallize the tetracyclic title compound (cb) as yellow prisms.

4. THE FOURTH CLASS OF COMPOUNDS

This class of compounds is represented by the structures

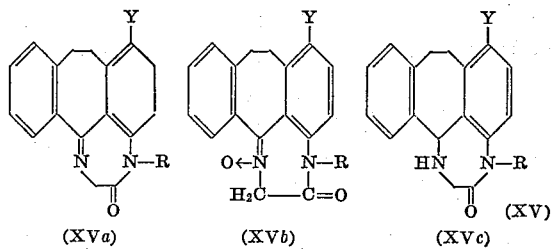

wherein Y and R have the previously ascribed meanings.

Example 18
2-CARBOXY-3'-AMINODIBENZYL

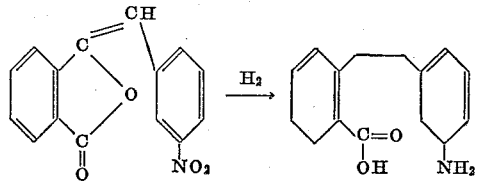

Dissolve 1 part of 3-(m-nitrobenzylidene)-phthalide in 40 parts of ethanol. Add thereto 1 part of sponge nickel catalyst, and hydrogenate the resulting admixture at room temperature under a hydrogen pressure of 50 pounds per square inch (p.s.i.g.).

Filter off the catalyst from the hydrogenated product, and evaporate the filtrate to dryness. Recrystallize the residue from ethyl acetate to obtain crystals of the title compound.

12
Example 19
2-CARBOXY-2'-CHLORO-5'-ACETAMIDODIBENZYL

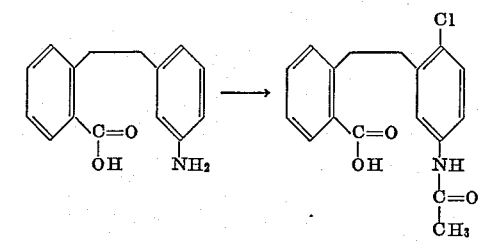

Reflux 1 part 2-carboxy-3'-amidodibenzyl in 10 parts of acetic acid and 2 parts of acetic anhydride for 10 minutes. Cool the refluxed mixture to 90° and then add 0.6 part of sulfuryl chloride thereto.

Heat the resultant on a boiling water bath for 30 minutes, and then evaporate the produced solution to dryness in vacuo.

Recrystallize the residue from ethanol to obtain the title compound as white needles.

Example 20
1-CHLORO-4-AMINO-DIBENZO[a,d]-SUBERONE

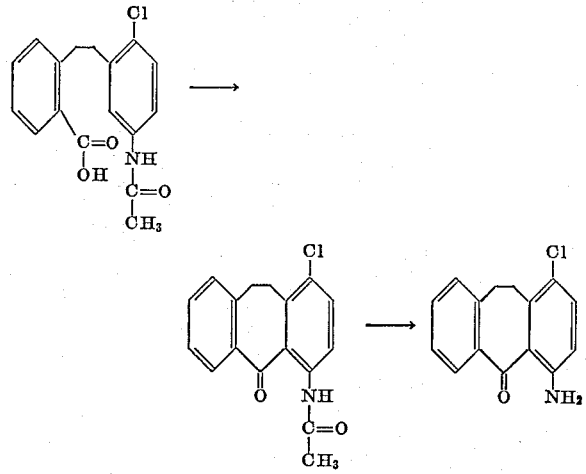

Dissolve 10 parts of 2-carboxy-2'-chloro-5'-acetamido-dibenzyl in 70 parts of acetic acid. Add to the resulting solution 10 parts of phosphorus pentoxide to form a reaction mixture. Heat the reaction mixture to reflux temperature and reflux same for 10 minutes.

Thereafter cool the refluxed mixture to 80°, and add water gradually to the cooled mixture until crystallization starts. Then add 100 parts of water thereto to precipitate 1-chloro-4-acetamido-dibenzo[a,d]-suberone completely. Filter the precipitate.

Dissolve the wet filter cake in 75 parts of ethanol. To the resulting solution add 50 parts of 20 percent sulfuric acid, and then reflux the obtained reaction mixture for 4 hours.

Dilute the refluxed reaction mixture to twice its volume with water, and add sodium hydroxide to neutralize the sulfuric acid. Prior to complete neutralization the title compound precipitates. Filter the precipitate and wash same with water.

Example 21
1-CHLORO-4-AMINO-DIBENZO[a,d]-SUBERONE-OXIME

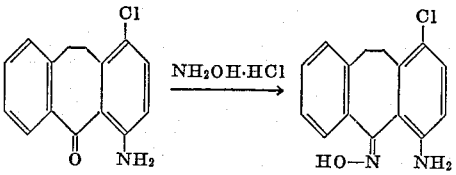

Dissolve 1 part of 1 - chloro - 4 - amino - dibenzo[a,d]-suberone and 1 part of hydroxylamine hydrochloride in a mixture of 5 parts of ethanol and 5 parts of pyridine. Reflux the obtained solution for 2 hours. Add water to the refluxed material to precipitate the title compound.

Example 22
7-CHLORO-3,4,8,9-TETRAHYDRODIBENZOCYCLOHEPTA[4,4a,5-e,f]1,4-DIAZEPIN-3(2H)-ONE-1-OXIDE

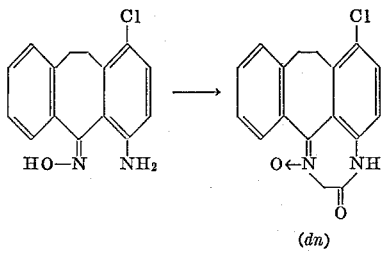

(dn)

Dissolve 3 parts of 1 - chloro - 4 - amino - dibenzo[a,d]-suberone-oxime in 50 parts of dioxane, and add dropwise (within a period of fifteen minutes) to the obtained solution 2 parts of bromacetylchloride at from 10° to 20°. Thereafter add slowly to the resultant 3 equivalents of sodium hydroxide (in the form of a 10% aqueous solution) under stirring to precipitate the tetracyclic title compound (dn).

Example 23
4-ALLYL-7-CHLORO-3,4,8,9-TETRAHYDRODIBENZOCYCLOHEPTA[4,4a,5-e,f]1,4-DIAZEPIN-3(2H)-ONE-1-OXIDE

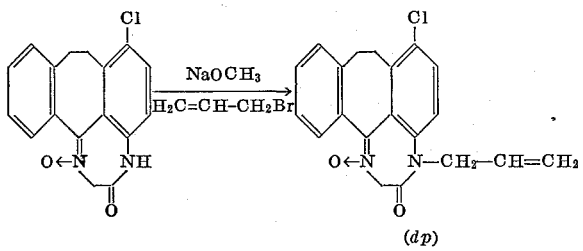

(dp)

Dissolve 2 parts (1 mole) of 7 - chloro - 3,4,8,9 - tetrahydrodibenzocyclohepta[4,4a,5-e,f]1,4 - diazepin-3(2H)-one-1-oxide in 30 parts of methanol. Admix with the obtained solution a concentrated methanolic solution of 1.1 mole of sodium methoxide. Evaporate the product to dryness.

Dissolve the residue (sodium salt) in 15 parts of DMF. To the resulting solution add 1 part of allyl bromide, and maintain the reaction mixture at room temperature (20°) for 24 hours. Thereafter add water to the reaction mixture to precipitate the tetracyclic title compound. Recrystallize the title compound (dp) from absolute ethanol.

Following the same procedure, but replacing allyl bromide by methyl iodide, results in the preparation of 7-chloro - 4 - methyl - 3,4,8,9 - tetrahydrodibenzocyclohepta[4,4a,5-e,f]1,4 - diazepin - 3(2H) - one - 1 - oxide (do).

Example 24
7-CHLORO-4-METHYL-1,2,3,4,8,9-HEXAHYDRODIBENZOCYCLOHEPTA[4,4a,5-e,f]1,4-DIAZEPIN-3-ONE

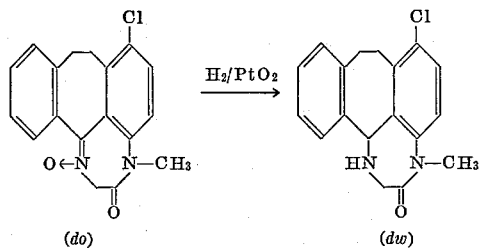

(do)                                  (dw)

Dissolve 1 part of (do) in 30 parts of acetic acid. Hydrogenate the resulting solution catalytically (0.005 part of platinum oxide as catalyst) at room temperature and atmospheric pressure. Filter off the catalyst. Evaporate the filtrate to dryness, and crystallize the tetracyclic base (dw) from ethanol.

5. THE FIFTH CLASS OF COMPOUNDS

This class of compounds is represented by the structures

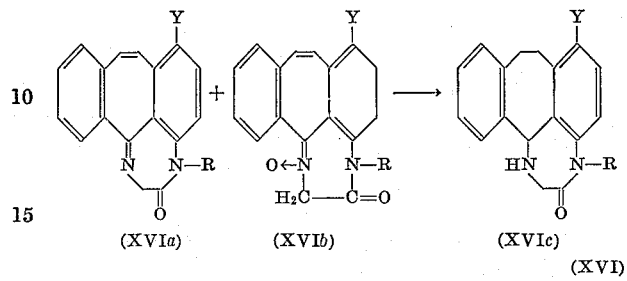

(XVIa)        (XVIb)        (XVIc)

(XVI)

wherein Y and R have the previously ascribed meanings.

Example 25
1-CHLORO-4-AMINO-DIBENZO[a,d]-SUBERENE-5-ONE

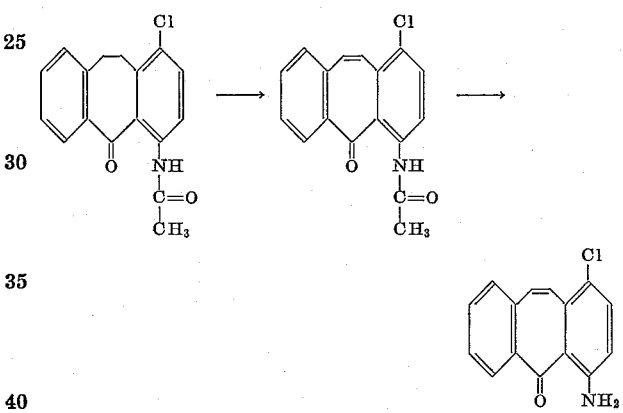

Dissolve 1 part of 1-chloro-4-acetamido-dibenzo[a,d]-suberone in 20 parts of acetic acid. Add 0.6 part (1 mole) of bromine to the obtained solution dropwise at 100° using a strong light (photochemical bromination).

Reflux the resulting solution until no more hydrogen bromide is evolved. Then dilute the refluxed solution to twice its volume with water. 1-chloro-4-acetamido-dibenzo[a.d]-suberene-(5)-one is thus precipitated as fine crystals. Filter the precipitate and wash same thoroughly with water.

Dissolve the washed filter cake in 20 parts of ethanol and 10 parts of 20 percent sulfuric acid. Reflux the obtained solution for 4 hours.

Pour the refluxed solution into 10 parts of 20 percent sodium hydroxide solution, whereby the title compound is precipitated.

Example 26
1-CHLORO-4-AMINO-DIBENZO[a,d]-SUBERENONE OXIME

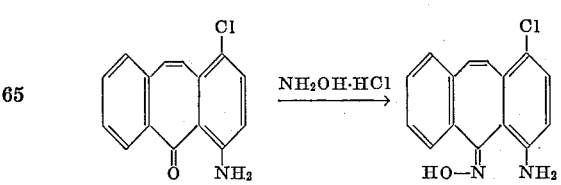

Dissolve 1 part of 1 - chloro - 4 - amino - dibenzo[a,d]-suberene-5-one and 1 part of hydroxylamine hydrochloride in a mixture of 5 parts of ethanol and 5 parts of pyridine. Reflux the obtained solution for 2 hours. Add water to the resulting reaction mixture to precipitate the title compound.

Example 27

7-CHLORO-3,4-DIHYDRODIBENZOCYCLOHEPTA[4,4a,5-e,f]
1,4-DIAZEPIN-3(2H)-ONE-1-OXIDE

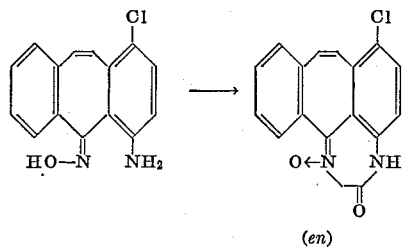

(en)

Dissolve 3 parts of 1 - chloro - 4 - amino - dibenzo [a,d]-suberenone oxime in 50 parts of dioxane, and add dropwise (within a period of fifteen minutes) 2 parts of bromacetyl chloride at 10° to 20°. Add slowly to the resultant under stirring 3 equivalents of sodium hydroxide (in the form of a 10% aqueous solution) to precipitate the tetacyclic title compound (en).

Example 28

7-CHLORO-3,4-DIHYDRODIBENZOCYCLOHEPTA[4,4a,5-e,f]
1,4-DIAZEPIN-3(2H)-ONE-1-OXIDE

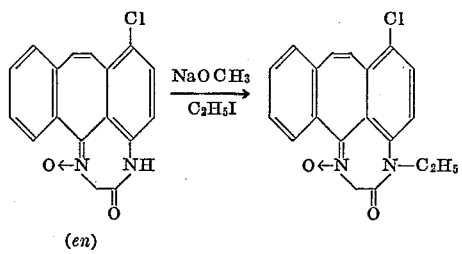

(en)

Dissolve 2 parts (1 mole) of (en) in 30 parts of methanol. Add a concentrated methanolic solution of 1.1 mole of sodium methoxide to the obtained solution. Evaporate the product to dryness.

Dissolve the residue (sodium salt) in 15 parts of DMF. Add (over a period of one hour) 1 part of ethyl iodide dropwise to the DMF solution.

Thereafter add water to the resultant to precipitate the title compound. Recrystallize same from methanol.

6. THE SIXTH CLASS OF COMPOUNDS

This class of compounds is represented by the structures

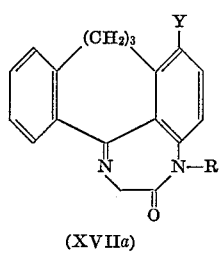 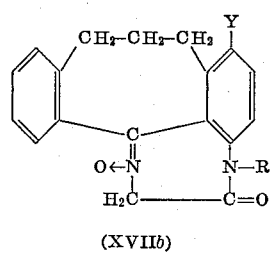

(XVIIa)           (XVIIb)

(XVII)

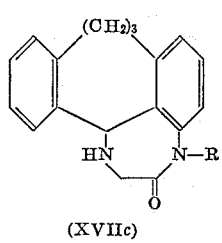

(XVIIc)

wherein Y and R have the previously ascribed meanings.

Example 29

1-(2'-CHLORO-5'-NITROPHENYL)-3-(2'-CARBOXY-PHENYL)-3-PROPENONE

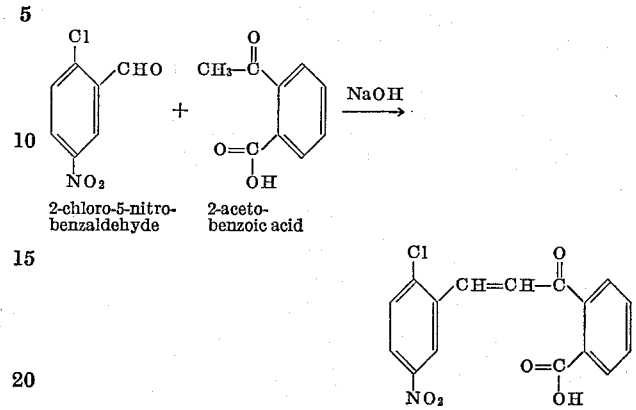

Admix 4.20 parts of 12 N (normal) sodium hydroxide (aq) solution with a mixture of 6.60 parts of 2-acetobenzoic acid, 7.45 parts of 2-chloro-5-nitrobenzaldehyde and 40 parts of ethanol. After maintaining the resulting admixture at room temperature for 35 minutes, add 5.0 parts of 11 N hydrochloric acid thereto. 11.5 parts of title compound, M.P. 228° to 232°, precipitate. Separate same by filtration.

Example 30

1-(2'-CHLORO-5'-ACETAMIDOPHENYL)-3-(2'-CARBOXYPHENYL)-PROPANE

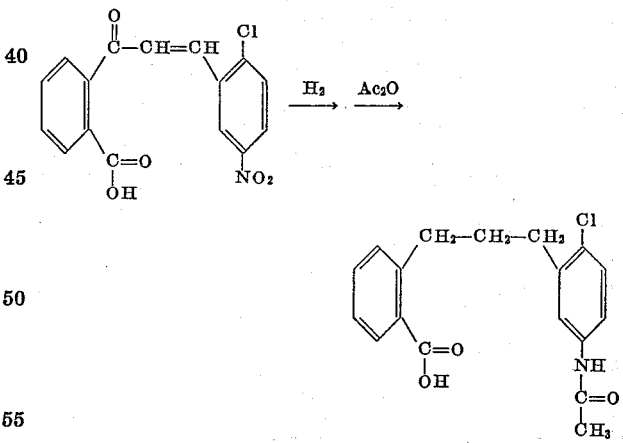

Shake for 24 hours at from 35° to 40° in a hydrogen atmosphere at 30 p.s.i.g. a mixture of 10 parts of 1-(2'-chloro - 5' - nitrophenyl) - 3 - (2' - carboxyphenyl) - 3-propenone, 2 parts of 10 percent palladium-charcoal catalyst and 300 parts of 70 percent aqueous acetic acid. Thereafter filter out the catalyst, and evaporate the filtrate to dryness.

Reflux the residue with 6 parts of red phosphorous and 90 parts of 48 percent hydriodic acid for 24 hours. Evaporate the refluxed material to dryness. Heat the residue at 60° with concentrated aqueous ammonia for fifteen minutes. Filter the resultant, and evaporate the filtrate to dryness.

Dissolve the residue in a minimum quantity of acetic anhydride, and reflux to resulting solution. Thereafter subject to vacuum distillation to remove volatile components. Crystallize the residue from ethanol/diethylether to yield the title compound.

Example 31

1-AMINO-4-CHLORO-5,6,7,12-TETRAHYDRO-DIBENZO[a,d]-CYCLOOCTENE-12-ONE

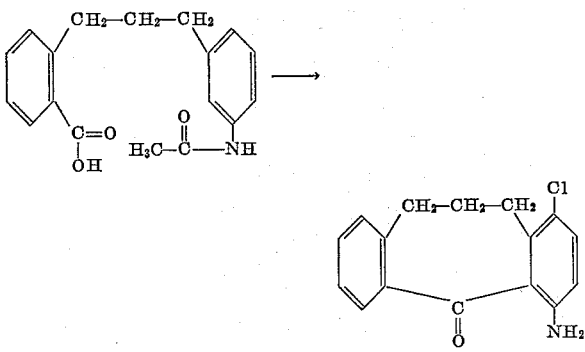

Reflux a mixture of 10 parts of 1-(2′-chloro-5′-acetamidophenyl)-3-(2′carboxyphenyl)-propane, 5 parts of thionyl chloride and 25 parts of anhydrous benzene until gas evolution ceases. Evaporate the thus-refluxed mixture to dryness in vacuo. Dissolve the residue in 200 parts of carbon disulfide, and add the produced solution, over a period of 50 hours, to a refluxing solution of 15 parts of anhydrous aluminum chloride in 180 parts of carbon disulfide.

For the latter refluxing arrange the apparatus so that the solution of residue, while dropping into the refluxing mixture, is further diluted by the refluxing solvent.

At the end of the 50 hours, i.e. after all of the residue is added to the refluxing mixture, discontinue the refluxing and add 200 parts of iced water to the refluxed material.

Separate the organic layer, and evaporate same to dryness. Dissolve the residue in 50 parts of 5 N hydrochloric acid, and reflux the obtained solution for 2 hours. Cool the refluxed material to room temperature and concentrate same in vacuo to two thirds its volume, whereby the title compound crystallizes.

Example 32

1-METHYLAMINO-4-CHLORO-5,6,7,12-TETRAHYDRO-DIBENZO[a,d]-CYCLOOCTENE-12-ONE

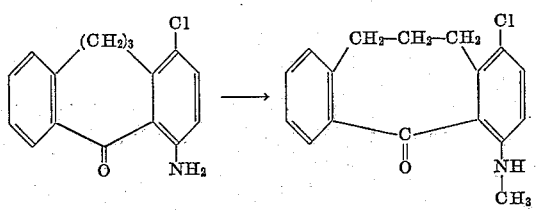

Add 1.90 parts of toluenesulfochloride to a mixture of 2.36 parts of 1-amino-4-chloro-5,6,7,12-tetrahydro-dibenzo[a,d]-cyclooctene-12-one and 10 parts of DMF. Maintain the resultant at room temperature for 5 hours prior to admixing therewith a suspension of 1.8 parts of sodium methoxide in 5 parts of DMF, followed by 5 parts of methyl iodide.

Maintain the thus-obtained reaction mixture at room temperature for 16 hours. Then remove the excess methyliodide in vacuo. Thereafter add to the resultant an equal volume of water, which produces a precipitate.

Filter and dry the precipitate, and then dissolve same in a minimum amount of concentrated sulfuric acid. Maintain at room temperature for 15 minutes prior to adding sufficient water thereto to precipitate the title compound. Recrystallize same from ethanol. Alternatively, recrystallization is from benzene.

Example 33

1-METHYLAMINO-4-CHLORO-5,6,7,12-TETRAHYDRO-DIBENZO[a,d]CYCLOOCTENE-12-ONE-OXIME

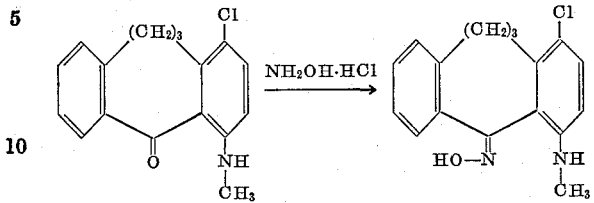

Dissolve 1 part of 1-methylamino-4-chloro-5,6,7,12-tetrahydrodibenzo[a,d]cyclooctene-12-one and 1 part of hydroxylamine hydrochloride in a mixture of 5 parts of ethanol and 5 parts of pyridine. Reflux the obtained solution for two hours. Add water to the resulting reaction mixture to precipitate the title compound as light yellow needles.

Example 34

7-CHLORO-4-METHYL-2,3,4,8,9,10-HEXAHYDRODIBENZO[a,d]CYCLOOCTA[1,12a,12-e,f]DIAZEPIN-3-ONE-1-OXIDE

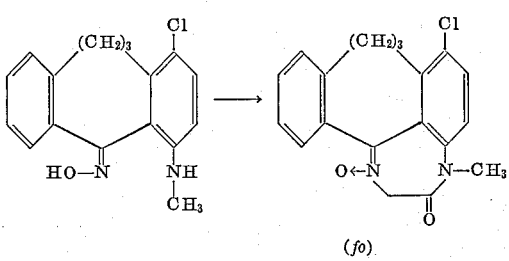

Dissolve 3 parts of 1-methylamino-4-chloro-5,6,7,12-tetrahydrodibenzo[a,d]cyclooctene-12-one-oxime in 60 parts of dioxane. Add dropwise (within a period of thirty minutes) 2 parts of bromacetyl chloride at 10° to 20°. Thereafter add gradually under stirring 3 equivalents of sodium hydroxide (as a 10% aqueous solution) to precipitate the tetracyclic title compound (fo).

Example 35

7-CHLORO-4-METHYL-2,3,4,8,9,10-HEXAHYDRODIBENZO[a,d]CYCLOOCTA[1,12a,12-e,f]DIAZEPIN-3-ONE

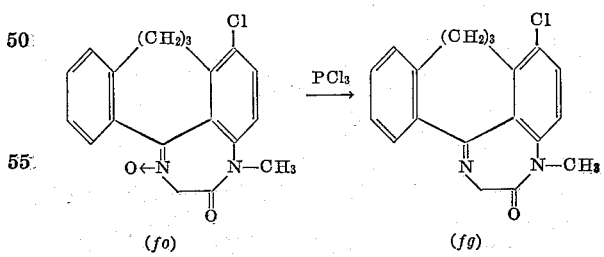

Dissolve 1 part of (fo) in a mixture of 30 parts of chloroform and 2 parts by volume of phosphorus trichloride. Reflux the obtained solution for 1 hour. Evaporate the resulting reaction mixture to dryness in vacuo. Shake the residue in admixture with methylene chloride, an excess of 30% (aq) sodium hydroxide and ice. Evaporate the organic solvent. Filter off the precipitated reaction product (fg). Recrystallize the title compound (fg) from methanol.

It is thought that the invention and its advantages will be understood from the foregoing description. It is apparent that various changes may be made in the processes and the intermediates, as well as the final products, without departing from the spirit and scope of the invention or sacrificing its material advantages. The products hereinbefore described are merely exemplary of every single product within the scope of Formula I, i.e. Ia, Ib and Ic.
What is claimed is:
1. A compound of the formula

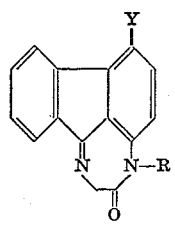

wherein
R is a member selected from the group consisting of a hydrogen atom, allyl and lower alkyl; and
Y is a member selected from the group consisting of a hydrogen atom and a chlorine atom.
2. 3,4 - dihydrofluoreno[1,9a,9 - e,f]1,4 - diazepin - 3 (2H)-one.
3. 7 - chloro-4-methyl-3,4-dihydrofluoreno[1,9a,9-e,f] 1,4-diazepin-3(2H)-one.
4. A compound of the formula

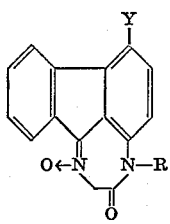

wherein
R is a member selected from the group consisting of a hydrogen atom, allyl and lower alkyl; and
Y is a member selected from the group consisting of a hydrogen atom and a chlorine atom.
5. 7-chloro-3,4-dihydrofluoreno[1,9a,9-e,f]1,4-diazepin-3(2H)-one-1-oxide.
6. 3,4 - dihydrofluoreno[1,9a,9-e,f]1,4-diazepin-3(2H)-one-1-oxide.
7. 4 - methyl - 3,4 - dihydrofluoreno[1,9a,9-e,f]1,4-diazepin-3-3(2H)-one-1-oxide.
8. A compound of the formula

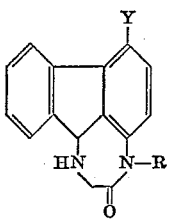

wherein
R is a member selected from the group consisting of a hydrogen atom, allyl and lower alkyl; and
Y is a member selected from the group consisting of a hydrogen atom and a chlorine atom.
9. 7 - chloro - 4-methyl-1,2,3,4-tetrahydrofluoreno[1,9a,9-e,f]1,4-diazepin-3-one.
10. A compound of the formula

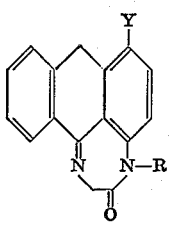

wherein
R is a member selected from the group consisting of a hydrogen atom, allyl and lower alkyl; and
Y is a member selected from the group consisting of a hydrogen atom and a chlorine atom.
11. 2,3,4,8 - tetrahydroanthra[1,9a,9-e,f]1,4-diazepin-3-one.
12. A compound of the formula

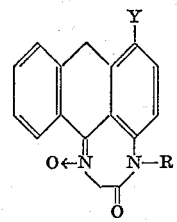

wherein
R is a member selected from the group consisting of a hydrogen atom, allyl and lower alkyl; and
Y is a member selected from the group consisting of a hydrogen atom and a chlorine atom.
13. 4 - methyl - 2,3,4,8-tetrahydroanthra[1,9a,9-e,f]1,4-diazepin-3-one-1-oxide.
14. A compound of the formula

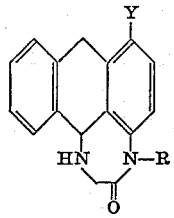

wherein
R is a member selected from the group consisting of a hydrogen atom, allyl and lower alkyl; and
Y is a member selected from the group consisting of a hydrogen atom and a chlorine atom.
15. A compound of the formula

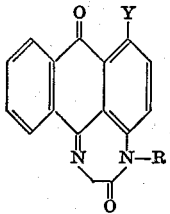

wherein
R is a member selected from the group consisting of a hydrogen atom, allyl and lower alkyl; and
Y is a member selected from the group consisting of a hydrogen atom and a chlorine atom.
16. 2,3,4,8 - tetrahydroanthra[1,9a,9-e,f]1,4-diazepine-3,8-dione.
17. A compound of the formula

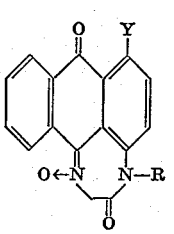

wherein
R is a member selected from the group consisting of a hydrogen atom, allyl and lower alkyl; and
Y is a member selected from the group consisting of a hydrogen atom and a chlorine atom.

18. A compound of the formula

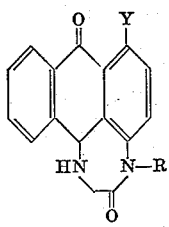

wherein
R is a member selected from the group consisting of a hydrogen atom, allyl and lower alkyl; and
Y is a member selected from the group consisting of a hydrogen atom and a chlorine atom.

19. A compound of the formula

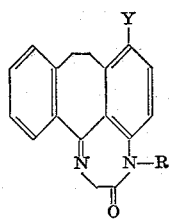

wherein
R is a member selected from the group consisting of a hydrogen atom, allyl and lower alkyl; and
Y is a member selected from the group consisting of a hydrogen atom and a chlorine atom.

20. A compound of the formula

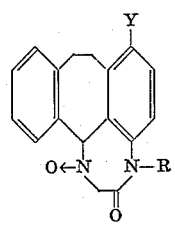

wherein
R is a member selected from the group consisting of a hydrogen atom, allyl and lower alkyl; and
Y is a member selected from the group consisting of a hydrogen atom and a chlorine atom.

21. 7-chloro - 3,4,8,9 - tetrahydrodibenzocyclohepta[4,4a,5-e,f]1,4-diazepin-3(2H)-one-1-oxide.

22. 4-allyl-7-chloro - 3,4,8,9 - tetrahydrodibenzocyclohepta[4,4a,5-e,f]1,4-diazepin-3(2H)-one-1-oxide.

23. A compound of the formula

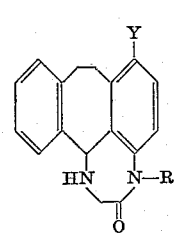

wherein
R is a member selected from the group consisting of a hydrogen atom, allyl and lower alkyl; and
Y is a member selected from the group consisting of a hydrogen atom and a chlorine atom.

24. 7-chloro-4-methyl - 1,2,3,4,8,9 - hexahydrodibenzocyclohepta[4,4a,5-e,f]1,4-diazepin-3-one.

25. A compound of the formula

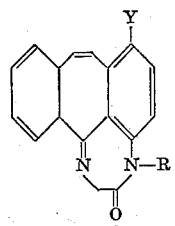

wherein
R is a member selected from the group consisting of a hydrogen atom, allyl and lower alkyl; and
Y is a member selected from the group consisting of a hydrogen atom and a chlorine atom.

26. A compound of the formula

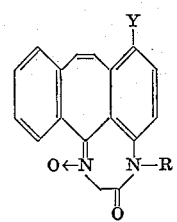

wherein
R is a member selected from the group consisting of a hydrogen atom, allyl and lower alkyl; and
Y is a member selected from the group consisting of a hydrogen atom and a chlorine atom.

27. 7-chloro-3,4 - dihydrodibenzocyclohepta[4,4a,5-e,f]1,4-diazepin-3(2H)-one-1-oxide.

28. 7-chloro-4-ethyl - 3,4 - dihydrodibenzocyclohepta[4,4a,5-e,f]1,4-diazepin-3-(2H)-one-1-oxide.

29. A compound of the formula

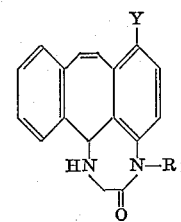

wherein
R is a member selected from the group consisting of a hydrogen atom, allyl and lower alkyl; and
Y is a member selected from the group consisting of a hydrogen atom and a chlorine atom.

30. A compound of the formula

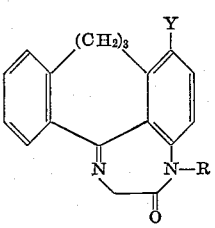

wherein
R is a member selected from the group consisting of a hydrogen atom, allyl and lower alkyl; and Y is a member selected from the group consisting of a hydrogen atom and a chlorine atom.

31. 7-chloro-4-methyl - 2,3,4,8,9,10-hexahydrodibenzo-[a,d]cycloocta[1,12a,12-e,f]-diazepin-3-one.

32. A compound of the formula

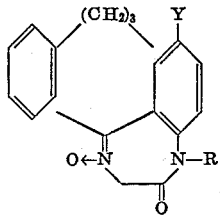

wherein
R is a member selected from the group consisting of a hydrogen atom, allyl and lower alkyl; and
Y is a member selected from the group consisting of a hydrogen atom and a chlorine atom.

33. 7-chloro-4-methyl - 2,3,4,8,9,10-hexahydrodibenzo-[a,d]cyclooctal[1,12a,12-e,f]diazepin-3-one-1-oxide.

34. A compound of the formula

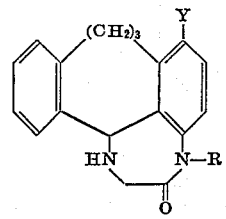

wherein
R is a member selected from the group consisting of a hydrogen atom, allyl and lower alkyl; and
Y is a member selected from the group consisting of a hydrogen atom and a chlorine atom.

References Cited by the Applicant

"Faserforschung und Textilechnik," 13, 43 (1962), No. 1, January.

WALTER A. MODANCE, *Primary Examiner.*

ROBERT T. BOND, *Assistant Examiner.*